(12) United States Patent
Rosing

(10) Patent No.: US 8,721,453 B2
(45) Date of Patent: May 13, 2014

(54) VIRTUAL ACTIVITIES THAT INCORPORATE A PHYSICAL ACTIVITY

(75) Inventor: Howard S. Rosing, Naples, FL (US)

(73) Assignee: G-Tracking, LLC, Naples, FL (US)

( * ) Notice: Subject to any disclaimer, the term of this patent is extended or adjusted under 35 U.S.C. 154(b) by 0 days.

(21) Appl. No.: 13/570,733

(22) Filed: Aug. 9, 2012

(65) Prior Publication Data

US 2013/0040714 A1 Feb. 14, 2013

Related U.S. Application Data

(60) Provisional application No. 61/521,440, filed on Aug. 9, 2011.

(51) Int. Cl.
*A63F 9/24* (2006.01)

(52) U.S. Cl.
USPC .............................. 463/42; 463/1; 705/14.1

(58) Field of Classification Search
USPC .................................. 463/25–42, 1; 705/14.1
See application file for complete search history.

(56) References Cited

U.S. PATENT DOCUMENTS

| | | |
|---|---|---|
| 2003/0078086 A1 | 4/2003 | Matsuyama |
| 2009/0171788 A1 | 7/2009 | Tropper |
| 2009/0216629 A1* | 8/2009 | James et al. ..................... 705/14 |
| 2010/0048272 A1 | 2/2010 | Koh |
| 2010/0069148 A1* | 3/2010 | Cargill ............................ 463/25 |
| 2010/0125028 A1 | 5/2010 | Heppert |
| 2011/0086712 A1* | 4/2011 | Cargill ............................ 463/42 |
| 2011/0093349 A1* | 4/2011 | Drescher et al. ........... 705/14.73 |
| 2013/0035991 A1* | 2/2013 | Romero et al. .............. 705/14.1 |

FOREIGN PATENT DOCUMENTS

WO 2010144691 A1 12/2010

* cited by examiner

*Primary Examiner* — Masud Ahmed

(74) *Attorney, Agent, or Firm* — Thomas | Horstemeyer, LLP

(57) ABSTRACT

A virtual activity is facilitated by receiving collected data related to a non-virtual, real-world physical activity performed by a user, evaluating the collected data to determine what benefit the user has earned by performing physical activity, and providing a benefit to the user that enables the user to virtually build or reconstruct something in a virtual world. In some embodiments, the user is enabled to virtually reconstruct a real-world location at which the physical activity was performed by unlocking a feature of that location within the virtual world. In other embodiments, the user is enabled to virtually build a fictional location by unlocking the ability to add a feature to that location within the virtual world.

23 Claims, 5 Drawing Sheets

VIRTUAL ACTIVITIES THAT INCORPORATE A PHYSICAL ACTIVITY

CROSS-REFERENCE TO RELATED APPLICATION

This application claims priority to U.S. provisional application entitled, "Virtual Activities That Incorporate A Physical Activity," having Ser. No. 61/521,440, filed Aug. 9, 2011, which is entirely incorporated herein by reference.

BACKGROUND

There are many virtual activities in which people enjoy participating. One such activity is online social networking games in which players interact with others in a virtual environment. Recently, social networking games in which players build virtual worlds have become particularly popular. One example of such a game is FarmVille™ in which participants create a customizable avatar (farmer) and build a farm using "farm coins" as the primary currency in the game. Players can earn experience points for performing certain actions in the game and, at certain experience point benchmarks, the player's level rises. As the player obtains more items and progresses through the levels, virtual crops and animals become available to the player via the "market" where items can be purchased using either farm coins or "farm cash." Farm cash is earned by leveling up or completing offers, or can be purchased using real currency.

While such virtual activities provide social interaction and enjoyment to those that participate in them, they are sedentary activities and do nothing to encourage physical activity or exercise. Indeed, it can be argued that online activities actually discourage physical activity. This is unfortunate because people's lives are becoming more and more sedentary and the physical health of the populace is suffering as a result. For example, obesity caused in part by lack of physical activity is on the rise and is having a particularly negative impact upon the health of people around the globe.

In view of the above facts, it can be appreciated that it would be desirable to have a virtual activity that somehow incorporates physical activity.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, virtual activities like online social networking games do not encourage physical activity. In fact, such activities can be said to discourage physical activity. Disclosed herein are virtual activities that incorporate physical activity. In particular, disclosed are virtual activities in which a participant must first perform some form of non-virtual, real-world physical activity in order to achieve something within the virtual activity. One or more parameters of the physical activity are sensed and evaluated to determine what can be achieved in the virtual environment. Because the ability of the participant to achieve things within the virtual environment is dependent upon performing the physical activity, the participant is encouraged to regularly perform the physical activity and therefore to live a more active lifestyle. In some embodiments, the virtual activity is an online social networking game in which the player virtually builds or reconstructs something from the real world as a reward for his or her physical activities.

In the following disclosure, various embodiments are described. It is to be understood that those embodiments are example implementations of the disclosed inventions and that alternative embodiments are possible. All such embodiments are intended to fall within the scope of this disclosure.

Figure 1:
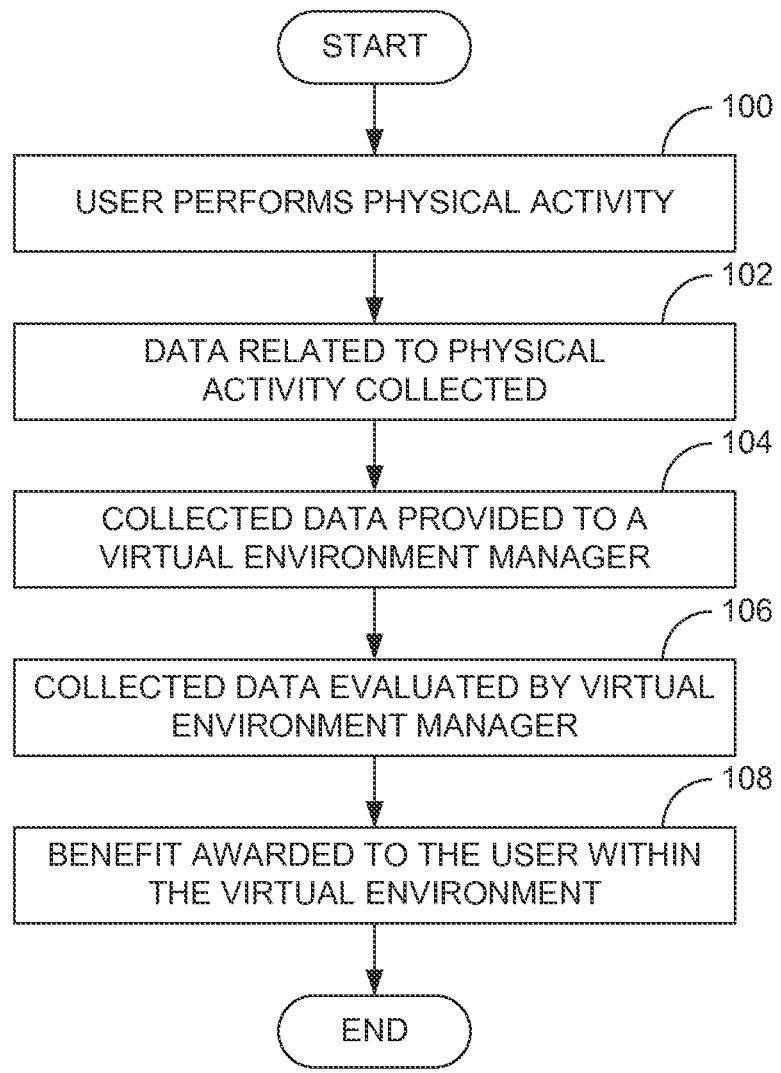
FIG. 1 is a flow diagram of an embodiment of a method for performing a virtual activity that incorporates a physical activity.

FIG. 1 illustrates an overview of a method for performing a virtual activity that incorporates a physical activity. Beginning with block 100, a participant or user performs a non-virtual, real-world physical activity. As used herein, the term "non-virtual, real-world physical activity" refers to an actual physical activity that does not comprise a virtual component. For example, playing golf on an actual golf course is a non-virtual, real-world physical activity, while playing a computer-based game in one's home that simulates golfing by presenting a graphical user interface that resembles a golf course and tracking the user's movements is not a non-virtual, real-world physical activity. The physical activity can be substantially any activity that requires at least mild physical exertion. Therefore, the activity could be, for example, exercising, playing a sport, participating in a recreational activity, performing manual work, or the like.

With reference to block 102 of FIG. 1, data related to the physical activity is collected. The data that is collected in some way quantifies or characterizes the physical activity that is performed. For example, if the physical activity were jogging, the data collected could relate to one or more of the duration of the jogging, the distance that is jogged, the pace of the jogging, the individual's heart rate while jogging, the route that was jogged, the environmental conditions in which the jogging was performed, etc.

Referring next to block 104, the collected data is provided to a virtual environment manager. In some embodiments, the virtual environment manager is a program or a series of programs that host and support a virtual activity, such as an online social networking game. In some cases, the virtual activity or game is performed or played in association with a public web site. As indicated in block 106, the collected data can then be evaluated by the virtual environment manager to determine what benefit to assign to the physical activity that was performed by the user. The benefit can be in the form of points or virtual currency that the user can apply to perform an action or acquire something within the virtual environment. Alternatively, the benefit can be some form of achievement award that is bestowed upon the user in the virtual world. A more detailed discussion of example forms of benefits is provided below. Whatever the form of the benefit, it can be awarded to the user within the virtual environment, as indicated in block 108.

Figure 2:
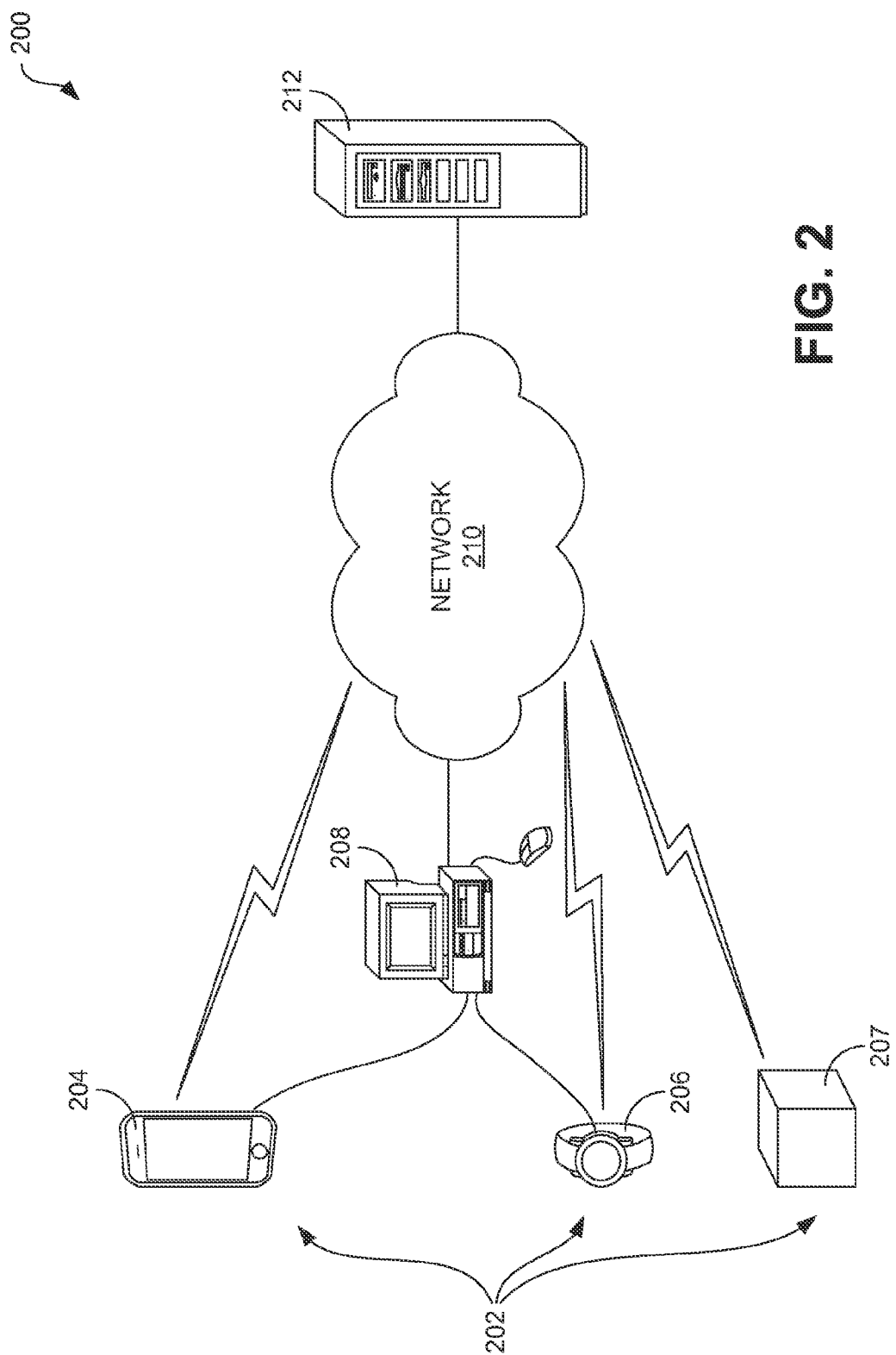
FIG. 2 is a block diagram of an embodiment of a system for supporting a virtual activity that incorporates a physical activity.

FIG. 2 illustrates an example system 200 for supporting a virtual activity, such as that described above in relation to FIG. 1. As shown in FIG. 2, the example system 200 includes one or more data collection devices 202, a user computing device 208, a network 210, and a remote computing device 212. As is described in greater detail below, the data collection devices 202 can be used to collect data regarding the physical activity performed by the user. In the illustrated example, the data collection devices 202 include a handheld device 204, such as a smart phone, a wearable device 206, such as a wrist watch, and a reader device 207 of the type that can read radio frequency identification (RFID) tags, QR codes, or bar codes. It is noted that those devices are just examples of the many different devices that could be used. Indeed, substantially any device that can collect parameters associated with a physical activity could be used.

The user computing device 208 is illustrated in FIG. 2 as comprising a desktop computer. It is noted, however, that the computing device 208 can be any computing device that can be used to participate in a virtual activity, such as an online social networking game. Therefore, the computing device 208 could alternatively comprise a notebook computer, a tablet device, or some other mobile computing device. The data collection devices 204 and 206 are shown in FIG. 2 as being physically coupled to the computing device 208, e.g., by a cable, to enable communication of the collected data to the computing device. However, such a physical connection is not required in cases in which the data collection device 202 can wirelessly communicate with the user computing device 208 and/or with the network 210 (schematically indicated in FIG. 2 with lightning bolts).

As is also shown in FIG. 2, the user computing device 208 is connected to the network 210, which can comprise one or more networks that form part of the Internet. The remote computing device 212 is also connected to the network 210 and can comprise a server computer that hosts the virtual activity (e.g., as a web site) so that it can be accessed remotely via the network, for example using the computing device 208.

Figure 3:
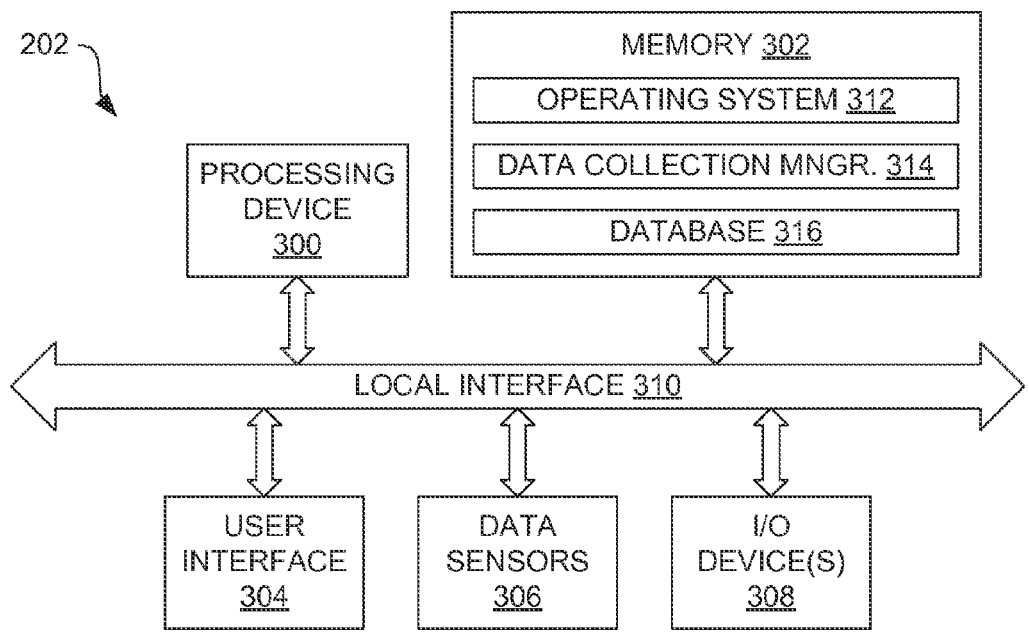
FIG. 3 is a block diagram of a data collection device shown in FIG. 2.

FIG. 3 is a block diagram illustrating an example architecture for the data collection devices 202, such as devices 204 and 206. As indicated in FIG. 2, each device 202 at least comprises a processing device 300, memory 302, a user interface 304, one or data more sensors 306, and one or more input/output (I/O) devices 308, each of which is connected to a local interface 310.

The processing device 300 controls general operation of the data collection device 202. In some embodiments, the processing device 300 comprises one or more of a microprocessor, a central processing unit (CPU), and an application-specific integrated circuit (ASIC). The memory 302 includes volatile memory elements (e.g., random access memory (RAM)) and/or nonvolatile memory elements (e.g., flash memory, hard disk, etc.).

The user interface 304 comprises the devices with which a user communicates with the data communication device 202 and can comprise, for example, one or more buttons or keys and a display, such as a touch-sensitive liquid crystal display (LCD).

The nature of the one or more data sensors 306 depends upon the data parameters that are to be collected during the physical activity. Example data parameters include time of day, elapsed time during which physical activity is performed, number of steps/strides taken, number of repetitions performed, geographic position, physical proximity, direction of travel, temperature, humidity, altitude, barometric pressure, speed, acceleration, g-force, heart rate, etc. Example sensors 306 or other measurement devices include a clock, chronometer, pedometer, GPS device, RFID tag, compass, thermometer, hygrometer, altimeter, barometer, accelerometer, heart rate monitor, etc. Of course other sensors or measurement devices can be provided depending upon the data parameters that are to be collected for the particular physical activity.

The one or more I/O devices 308 comprise the various components that are used to communicate collected data to another device, such as a local or remote computing device. In some embodiments, the I/O devices 308 include a wireless communication device that includes a wireless transmitter and a wireless receiver. Wireless communications can be cellular network communications or short-range communications performed using a short-range communication protocol such as IEEE 802.11 (WiFi) or Bluetooth.

The memory 302 comprises various programs and/or algorithms (i.e., logic) including an operating system 312 and a data collection manager 314 that manages the collection of the various data parameters. Those parameters can be stored within a database 316 of the memory 302.

Figure 4:
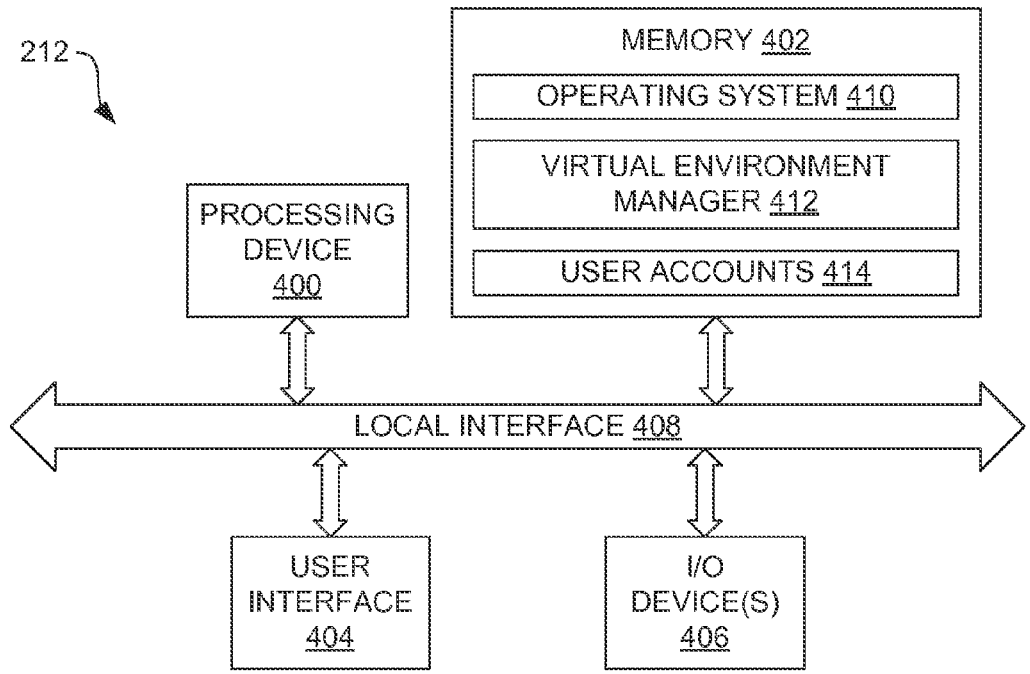
FIG. 4 is a block diagram of a remote computing device shown in FIG. 2.

FIG. 4 is a block diagram illustrating an example architecture for the remote computing device 212. The computing device 212 also comprises a processing device 400, memory 402, a user interface 404, and at least one I/O device 406, each of which is connected to a local interface 408.

The processing device 400 can include a CPU while the memory 402 includes any one of or a combination of volatile memory elements (e.g., RAM) and nonvolatile memory elements (e.g., hard disk, ROM, tape, etc.).

The user interface 404 comprises the components with which a user interacts with the computing device 212, such as a keyboard, mouse, and a display. The one or more I/O devices 406 are adapted to facilitate communications with other devices via the network 210 and can include one or more communication components such as a modulator/demodulator (e.g., modem), network card, etc.

The memory 402 comprises various programs and/or algorithms (i.e., logic) including an operating system 410 and a virtual environment manager 412 that manages and supports the virtual activity. In some embodiments, such management and support includes hosting a web site associated with the virtual activity, which can comprise an online social networking game. Information regarding users of the virtual activity can be stored by the virtual environment manager 412 in a user account database 414.

Figure 5:
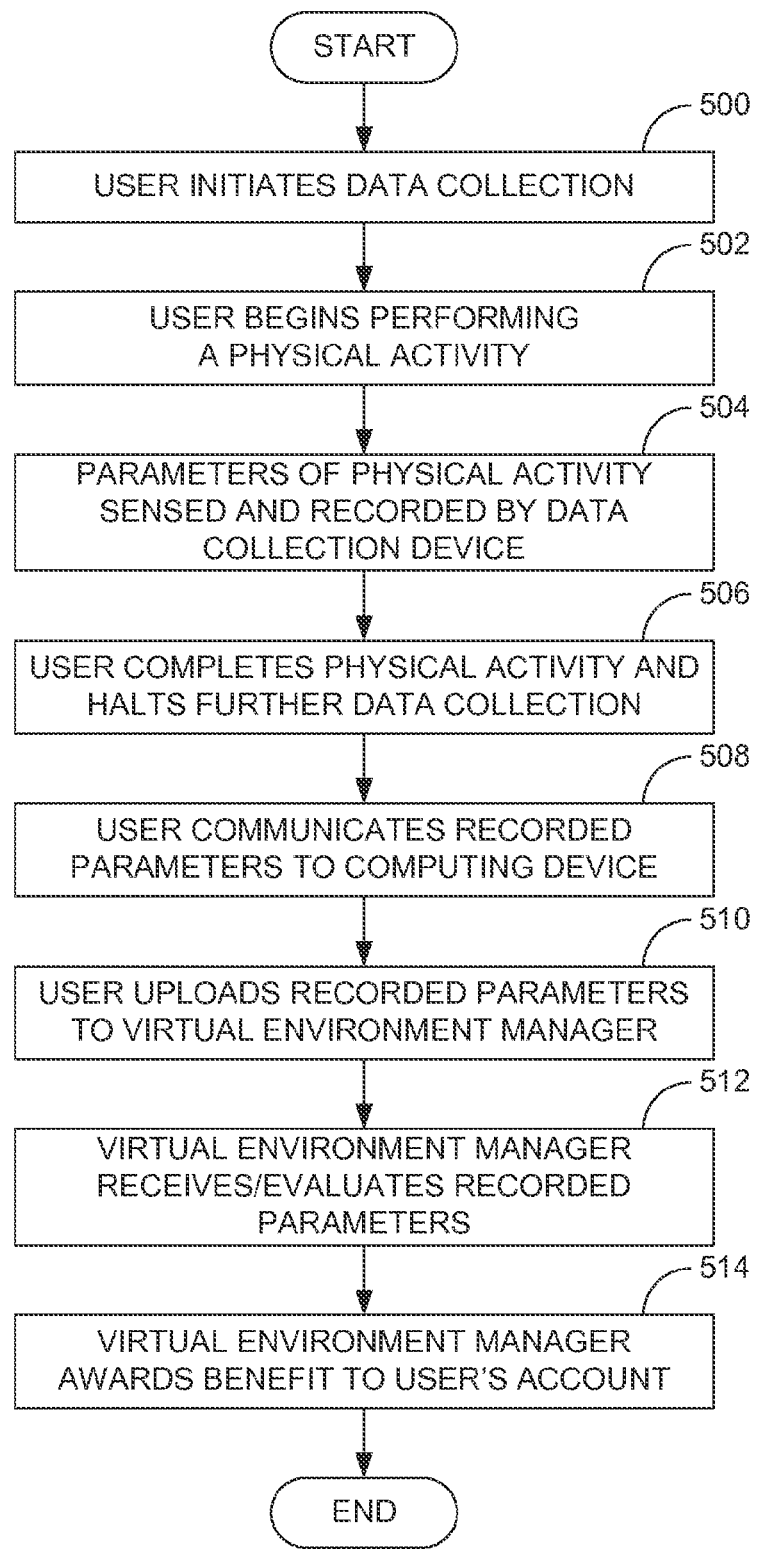
FIG. 5 is a flow diagram of a further embodiment of a method for performing a virtual activity that incorporates a physical activity.

FIG. 5 describes a further method for performing a virtual activity that incorporates a physical activity, which may implement one or more components depicted in FIG. 2. Beginning with block 500 of FIG. 5, a user initiates data collection on the data collection device, which the user may have on his or her person. Such initiation can comprise initiating sensing and recording of data relevant to a physical activity about which the user is about to begin performing.

Referring next to block 502, the user begins performing the physical activity. As mentioned above, the physical activity that is performed can be substantially any physical activity and depends upon what is required to receive benefit in the virtual environment. In some embodiments, the physical activity is an exercise activity such as walking, jogging, running, aerobics, yoga, hiking, climbing, rollerblading, skating, skateboarding, swimming, lifting weights, or the like. In other embodiments, the physical activity is a sports activity, such as tennis, racketball, squash, handball, basketball, baseball, football, hockey, soccer, lacrosse, gymnastics, martial arts, golf, skiing, snowboarding, surfing, or the like. In other embodiments, the physical activity is a recreational activity involving physical activity, such as motorsports, fishing, gardening, visiting a water park, visiting an amusement park, or the like. In other embodiments, the physical activity can be a work-related activity involving physical activity, such as performing manual labor, cutting the lawn, trimming the hedges, shoveling snow, or the like. These are but a few examples of the nearly infinite number of physical activities in which the user could engage. Therefore, many other examples exist and each is intended to fall within the scope of this disclosure.

Irrespective of the nature of the physical activity that is performed, parameters of the physical activity are sensed and recorded by the data collection device, as indicated in block 504. Generally speaking, the parameters are those that somehow characterize or quantify the amount of physical activity that is being performed. The actual parameters that are sensed and recorded can depend upon the particular physical activity in which the user engages as well as the virtual activity at issue. For example, if the physical activity is jogging, the recorded parameters can include the duration of the jogging, the distance traveled, and the pace at which the jogging was performed as each of those parameters is indicative of the amount of physical effort that was exerted by the user. Of course, other parameters can also be indicative of the physical effort involved. For instance, the temperature, humidity, and altitude during which the jogging was performed also provide an indication of the user's effort. Notably, parameters other than those that pertain to the amount of effort expended can be sensed and recorded. For example, the geographical position of the user and the route the user traversed during his or her jog can also be sensed and recorded. As is described below, such data can be relevant to the benefit the user is awarded in the virtual environment.

Once the physical activity has been completed, the user can halt further data collection, as indicated in block 506. At this point, the data can be provided to the entity that hosts the virtual activity. In the example of FIG. 4, this entity is the virtual environment manager 412 of the remote computing device 212 (e.g., server computer). In embodiments in which the data collection device is capable of directly transmitting this information over a network (e.g., using a cellular network), the parameters can be transmitted directly to the remote computing device 212. In other embodiments, however, the parameters may instead be communicated to the local user computing device, as indicated in block 508.

Assuming the recorded parameters have been communicated to the user computing device, the user can upload the parameters from the computing device to the virtual environment manager, as indicated in block 510. By way of example, this can be achieved by accessing a web site hosted by the virtual environment manager with the user computing device and selecting an upload (or equivalent) command. As indicated in block 512, the virtual environment manager receives the recorded parameters and evaluates them. Evaluation can be a determination of the amount and/or nature of benefit that the performed physical activity earns within the virtual environment. For example, 30 minutes of jogging under a certain set of conditions (temperature, humidity, altitude, topography) may yield a certain level or type of benefit, while 60 minutes of jogging under the same or a different set of conditions may yield another level or type of benefit. In some embodiments, the greater the physical effort exerted, the greater or better the benefit that is awarded to the user within the virtual embodiment.

Once the recorded parameters have been evaluated, the virtual environment manager can award the appropriate benefit to the user within the virtual environment, as indicated in block 514. The nature of this benefit can take many forms. In some embodiments, the benefit comprises a number of points or an amount of virtual currency that can be applied by the user to do something within the virtual environment, such as purchase virtual goods or services within the virtual environment. In other embodiments, the benefit is an achievement award that is bestowed upon the user in the virtual environment.

An achievement award can take many different forms. In some embodiments, the achievement award relates to "unlocking" certain features within the virtual environment so as to build or reconstruct something from the real world within a virtual world. What is built or reconstructed can be either natural or manmade structures. In some embodiments, what is built or reconstructed bears a direct relationship to the physical activity that the user has performed. For example, what is built or reconstructed can be a virtual representation of where the physical activity occurred. Several examples of this are described below.

As a first example, consider a jogger. As mentioned above, the duration, distance, and/or pace that the user has jogged can be tracked. In addition, other parameters such as the time and geographic location (e.g., determined using GPS) can also be sensed and recorded. Therefore, the route, and the roads, along which the user jogged can be recorded. In such a case, the benefit provided to the user in the virtual world for the physical activity can be the unlocking of the streets or paths the jogger traversed within a map of the geographical location (e.g., city) presented in the virtual world. In such a scheme, each new route along which the user jogs could then be used to unlock further streets and/or paths and the user would be incentivized to jog different routes in his or her geographical area in an effort to, for example, unlock all of the streets/paths to complete a map of that geographical area. In this way, the user virtually could reconstruct the city in which he or she lives.

As another example, consider the physical activity of snow skiing at a particular ski resort (e.g., Vail, Steamboat). In such a scenario, the various ski runs of the resort that the skier has skied can be monitored. In similar manner to the jogging example above, the achievement award for completion of the runs could be unlocking of the runs on a map of the mountain presented in the virtual world. The user would be incentivized to ski as many of the different runs of the mountain as possible in an effort to virtually reconstruct the entire mountain.

As a further example, the physical activity could be playing certain golf courses (e.g., Augusta, St. Andrews) or their holes and the virtual activity could be virtually reconstructing the golf courses or holes by unlocking the courses/holes on maps of the courses presented in the virtual world. The user would be incentivized to play as many courses/holes as possible in an effort to virtually reconstruct many different courses.

As another example, the physical activity could be riding rides at an amusement park (e.g., Disneyland, Six Flags) and the virtual activity could be virtually reconstructing the amusement park ride by ride by unlocking each in a map of the park. In such a case, the user could attempt to virtually reconstruct the entire park by riding every ride in the park.

Figure 6:
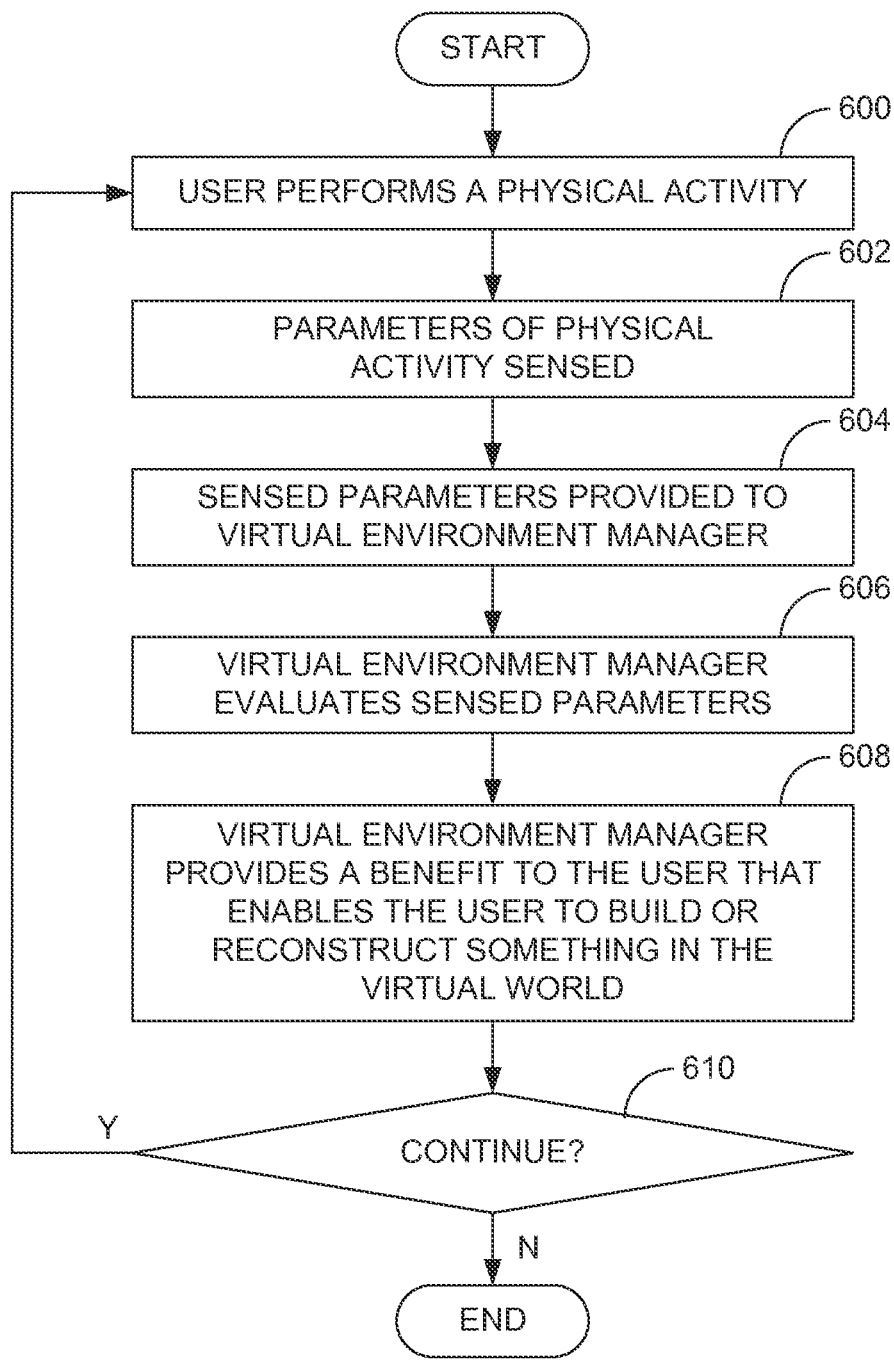
FIG. 6 is a flow diagram of a further embodiment of a method for performing a virtual activity that incorporates a physical activity.

The above examples are just a few of the nearly infinite number of possibilities of a performed physical activity being used to virtually build or reconstruct something that is related to the physical activity. FIG. 6 is a flow chart that generally describes a method for performing a virtual activity that incorporates a physical activity in which the benefit within the virtual world is an achievement award that is related to the physical activity. Jogging, skiing, golfing, and riding amusement park rides are again be discussed in relation to FIG. 6 as examples to provide a clearer understanding of the method.

Beginning with block 600 of FIG. 6, the user performs a physical activity. While the physical activity is performed, parameters of the physical activity are collected, as indicated in block 602, and recorded if necessary. In the embodiment of FIG. 6, the parameters include information as to the location at which the user performed the activity. For example, when the activity is jogging, the location of the user can be continually tracked so that the route that the user traversed can be determined. Such tracking can be performed using a GPS device. Notably, other parameters can also be collected. For example, the duration, distance, pace, environmental conditions, date, time, etc. of the jog can be recorded. As described below, such parameters can be linked to the route that the user traversed and, in some embodiments, presented to the user in association with the route if desired.

When the activity is skiing, the location of the user can also be tracked and recorded. Such tracking can similarly be performed using a GPS device. Alternatively, however, the location can be tracked using proximity sensors located at predetermined locations on the mountain. For example, if the user's lift ticket included a radio frequency identification (RFID) tag that can be sensed by an RFID tag reader located at the entry point and exit point of each ski run, the runs that the user traversed can be automatically tracked. In such a case, the data collection device is independent of the user. As with the jogging example, other parameters can also be tracked. For example, the duration, distance, pace, environmental conditions, date, time, etc. for each ski run can be tracked. If the time is tracked, the number of times each run was traversed can also be tracked.

The location of the user can also be tracked when the activity is playing golf or riding rides at an amusement park. In both of those cases, the location of the user, and therefore the holes the user played or the rides the user rode, can be tracked and recorded using GPS. Alternatively, the holes played and the rides rode can be tracked using proximity sensors. For example, in the golf scenario, the user can swipe an identification tag, such as an RFID tag, a QR code, or a bar code across by a reader near the tee box or the green of each hole to log that the hole was played. In the amusement park scenario, the user can similarly swipe an identification tag by a reader positioned at the entrance or exit of each ride. Again, other parameters can also be tracked. For example, the environmental conditions, date, time, etc. when each hole was played or each ride was ridden can be tracked. With particular regard to golf, the user's score on each hole or each round can also be tracked. By way of example, the scores could be logged into a computing device located at the end of each hole or the end of the course.

Either while the physical activity is performed or after it has been completed, the tracked parameters are provided to the virtual environment manager, as indicated in block 604. As described above, the parameters can be sent from the user's data collection device via a local computing device and/or a network. In cases in which parameters were collected by another data collection device, such as a reader of the type described above in relation to the skiing, golf, and amusement park examples, parameters can also be provided by those devices.

Once the virtual environment manager receives the parameters it can evaluate them, as indicated in block 606. In the embodiment of FIG. 6, the evaluation comprises a determination of what to enable the user to build or reconstruct in the virtual world. In some embodiments, there is direct correspondence between the physical activity that was performed in the real world and what is built or reconstructed the virtual world. In some embodiments, the benefit can be awarded by "unlocking" a feature that exists in the real world so that the user can virtually reconstruct the location at which his or her physical activity was performed. What this means, of course, is dependent upon the nature of the performed activity.

When the activity is jogging, the various routes along which the user jogged can be unlocked on a map of a given geographical area, such as a city. By way of example, the map can show all of the streets of the geographical area in phantom lines and the portions of the streets that form the jogged routes can be highlighted, for instance with bolder and/or colored lines. By jogging various different routes over time, the user can then unlock more streets to build the map (as well as the geographical area) with the goal of completing it by running along every street in the area. In some embodiments, each street portion that is traversed can be highlighted in the same manner to simply indicate that the street portion had been traversed. In other embodiments, one or more of the routes that were traversed can be separately highlighted, for example using different colors. In such a case, the user would be able to distinguish between different jogs he or she has completed. In addition, other parameters that were collected during the jog, such as time, duration, pace, and environmental conditions can be presented to the user in association with each individual route. As an example, each route identified on the map can be tagged with an icon that, when selected by the user, causes a pop-up box to appear that lists the parameters of the jogging session. In another alternative, certain significant routes can be uniquely highlighted on the map. For example, if the user maintained a particularly fast pace on one particular route, that route can be highlighted in red.

Similar achievement awards can be provided when the activity is skiing. In that case, the various ski runs along which the user skied can be unlocked on a map of the mountain. By way of example, the map can show all of the runs of the mountain in phantom lines and once and the portions of the runs that were skied can be highlighted. In such a case, the user can strive to complete as many of the runs of the mountain as he or she can, either in one day, multiple days, or over the course of a larger time frame in an effort to virtually reconstruct the entire mountain. In addition to being motivated to complete mountain, the user is motivated to visit other mountains and virtually reconstruct them as well so that the user can "collect" multiple reconstructed mountains. Each route the user skied can be highlighted in the same manner, in which case the routes could be all highlighted in the same manner. Alternatively, each run that the user skied can be individually highlighted, in which case the parameters associated with each run, such as the date, time, duration, pace, and environmental conditions can be presented to the user in association with each individual run. As an example, each completed run identified on the map can be tagged with an icon that, when selected by the user, causes a pop-up box to appear that lists the parameters of the run. If a given run is skied more than one time by the user, the number of times the run was skied can also be displayed. In such a case, the user can be motivated to repeatedly ski certain runs. In addition, other significant information, like the fastest time the user had on a given run, can be displayed.

The golf case can be similar to the skiing case except, instead of unlocking and highlighting ski runs on a mountain map, holes can be unlocked and highlighted on a golf course map to virtually reconstruct the golf course. Parameters associated with each hole can be displayed, such as the date, time, and environmental conditions. In cases in which a score was logged for each hole, the displayed parameters can also include the score for each hole. If a hole is played more than once, the number of times the hole has been played can also be displayed. If a score is displayed for each hole, either the user's latest score or best score can be displayed for any hole that was played more than once by the user.

The amusement park case is also similar to the skiing and golf cases although, instead of ski runs and golf holes, individual amusement park rides can be unlocked and highlighted on a park map to enable the user to virtually reconstruct the park. Again, additional parameters, such as the date and time, can be displayed in association with each ride. In addition, the number of times each ride has been ridden can be displayed. In such a case, the user is motivated not only ride each ride at the park, but also to ride certain rides many times.

Once the parameters have been evaluated, the virtual environment manager can provide a benefit to the user that enables the user to build or reconstruct something in the virtual world, as indicated in block 608. As described above in relation to the jogging, skiing, golfing, and amusement park examples, the benefit can be enabling the user to virtually reconstruct the location (e.g., city, ski resort, golf course, amusement park) at which the physical activity was performed by unlocking a feature (e.g., street, ski run, golf hole, park ride) of that location within the virtual world. As was also described above, the features can, for example, be unlocked in a map of the location that is displayed to the user. Notably, however, the benefit can take the form of enabling the user to virtually build a fictional location that does not exist in the real world by unlocking the ability to add one or more features to that location within the virtual world. In some embodiments, the feature that can be added to the fictional location corresponds in some manner to the physical activity that was performed. For example, if the user jogs 5 miles, the benefit could be unlocking the ability of the user to add 5 miles worth of roads to his or her virtual world. In such a case, additional enjoyment could be had in the form of having the freedom of creating one's own world as one wishes.

Once the benefit has been bestowed upon the user and the user has built/reconstructed something within the virtual world, flow can return to block 600 where further physical activity is performed and further parameters associated with the activity are collected. Accordingly, the process continues in an endless loop in which the user is continually motivated to be physically active.

In the foregoing discussions, benefits that are awarded can be solely appreciated by the individual user. In some embodiments, however, the virtual activity can take the form of an online social networking activity or game. By way of example, if a given user has multiple friends or family members who also virtually reconstruct things, like the aforementioned cities, mountains, golf courses, and amusement parks, the user can enable those friends and family to see his or her programs, and vice versa. Therefore, each participating individual has the opportunity to share and interface with others via the virtual activity.

In addition to simply sharing one's progress, the user can compete with other users. For example, users can compete to virtually reconstruct the largest city by jogging the most streets of the city or virtually reconstruct the most number of cities, ski resorts, golf courses, amusement parks, etc. Such competition provides further motivation to the user to perform the physical activities. In some embodiments, credit, such as points or virtual currency, can be awarded to the user as he or she builds his or her virtual world to enable direct comparison with other users.

In other embodiments, the social aspect of the activity can take the form of teamwork. In such a case, users can form teams, for instance using an interface of the web site which hosts the virtual activity, and the teams can work together to build virtual worlds. For example, a team could be formed to complete a map of Manhattan with each individual on the team contributing to the endeavor by jogging a different route of the island. As another example, a less skilled skier could team up with a more skilled skier to complete a map of a given ski resort with the more skilled skier skiing the more difficult runs and the less skilled skier skiing the less difficult runs.

Irrespective of its form, the social aspect of the virtual activity increases the attractiveness of the activity, and therefore increases the likelihood that the physical activity will be performed.

Although a primary goal of the virtual activity described herein is to encourage physical activity, it is possible to monetize the virtual activity. Potential monetization options include charging user fees and displaying advertising on the web site on which the virtual activity is hosted. When the physical activity is one in which the user must already pay a fee to perform the physical activity, however, revenue can potentially be generated from the entities that charge the users. For example, in order to ski a mountain of a ski resort, the ski resort typically charges an entrance fee in the form of a lift ticket. Because the virtual activity provides an incentive for users to pay that entrance fee (potentially on multiple occasions) in order to ski and unlock the various runs, the ski resort is provided with an incentive to pay the host of the virtual activity to be included in that virtual activity. In such a case, a ski resorts can be required to pay a participation fee to the virtual activity host in order for users to be able to virtually reconstruct their mountain in the virtual activity.

It is noted that other forms of benefit can be provided to the user outside of the virtual environment. For instance, it is possible for entities that benefit from the performed physical activities to provide benefits back to the user. For example, the ski resort, golf course, amusement park, or other location that charges for entry could provide discounts or other rewards to the user to encourage them to continue performing the physical activity.

It is further noted that other information can be added to the virtual worlds that are constructed. In one embodiment, users can capture and upload images for inclusion in their maps. As an example, a user can capture a digital image of each hole of a golf course the user is playing. If the device used to capture the image is GPS enabled, the image can be automatically GPS tagged and associated with a point on the map at which it was captured. The image can, for example, then be displayed by selecting an appropriate icon associated with the unlocked hole at which it was captured.

In view of the foregoing disclosure, it can be appreciated that the described systems and methods can be used to encourage individuals to engage in physical activity in a time in which people engage in such activities with less and less frequency. Moreover, this encouragement is provided with a vehicle (e.g., online social networking) that is rapidly gaining in popularity and that is normally responsible for discouraging physical activity.

The invention claimed is:

1. A method of performing a virtual activity comprising:
 a user performing a non-virtual, real-world physical activity;
 a data collection device collecting data related to the physical activity;
 a computing device evaluating the collected data; and
 the computing device providing a benefit to the user that enables the user to virtually build or reconstruct something in a virtual world that represents the real-world location at which the physical activity was performed by the user.

2. The method of claim 1, wherein the physical activity is one of an exercise, sports, recreational, or work activity.

3. The method of claim 1, wherein collecting data comprises sensing physical parameters related to the physical activity.

4. The method of claim 1, wherein evaluating the collected data comprises determining what benefit the user has earned from the performed physical activity.

5. The method of claim 1, wherein providing a benefit comprises enabling the user to virtually reconstruct the real-world location at which the user performed the physical activity by unlocking a feature of that location within the virtual world.

6. A method for facilitating a virtual activity, the method comprising:
   a computing device receiving collected data related to a non-virtual, real-world physical activity performed by a user;
   the computing device evaluating the collected data to determine what benefit the user has earned by performing physical activity; and
   the computing device providing a benefit to the user that enables the user to virtually build or reconstruct something in a virtual world that represents the real-world location at which the physical activity was performed by the user.

7. The method of claim 6, wherein receiving collected data comprises receiving information related to a location at which the physical activity was performed.

8. The method of claim 7, wherein receiving information related to a location comprises receiving global position system (GPS) information that identifies the location.

9. The method of claim 6, wherein providing a benefit comprises enabling the user to virtually reconstruct the real-world location at which the physical activity was performed by unlocking a feature of that location within the virtual world.

10. The method of claim 9, wherein enabling the user to virtually reconstruct the real-world location comprises unlocking the feature within a displayed map of the real-world location.

11. The method of claim 9, wherein the real-world location is a geographical area and the feature is at least a portion of a road in the geographical area that the user traversed in the real world in performing the physical activity.

12. The method of claim 9, wherein the real-world location is a ski resort and the feature is at least a portion of a ski run of the ski resort that the user traversed in the real world in performing the physical activity.

13. The method of claim 9, wherein the real-world location is a golf course and the feature is a hole of the golf course that the user played in the real world in performing the physical activity.

14. The method of claim 9, wherein the real-world location is an amusement park and the feature is a ride of the amusement park that the user rode in the real world in performing the physical activity.

15. A non-transitory computer-readable medium that stores a program configured to facilitate a virtual activity, comprising:
   logic configured to receive collected data related to a non-virtual, real-world activity physical performed by a user;
   logic configured to evaluate the collected data to determine what benefit the user has earned by performing physical activity; and
   logic configured to provide a benefit to the user that enables the user to virtually build or reconstruct something in a virtual world that represents the real-world location at which the physical activity was performed by the user.

16. The computer-readable medium of claim 15, wherein the logic configured to receive data comprises logic configured to receive information related to the location at which the physical activity was performed.

17. The computer-readable medium of claim 16, wherein the logic configured to receive information related to the physical location comprises logic configured to receive global position system (GPS) information that identifies the location at which the physical activity was performed.

18. The computer-readable medium of claim 15, wherein providing a benefit comprises enabling the user to virtually reconstruct the real-world location at which the physical activity was performed by unlocking a feature of that location within the virtual world.

19. The computer-readable medium of claim 18, wherein enabling the user to virtually reconstruct the real-world location comprises unlocking the feature within a displayed map of the real-world location.

20. The computer-readable medium of claim 18, wherein the real-world location is a geographical area and the feature is at least a portion of a road in the geographical area that the user traversed in the real world in performing the physical activity.

21. The computer-readable medium of claim 18, wherein the real-world location is a ski resort and the feature is at least a portion of a ski run of the ski resort that the user traversed in the real world in performing the physical activity.

22. The computer-readable medium of claim 18, wherein the real-world location is a golf course and the feature is a hole of the golf course that the user played in the real world in performing the physical activity.

23. The computer-readable medium of claim 18, wherein the real-world location is an amusement park and the feature is a ride of the amusement park that the user rode in the real world in performing the physical activity.

* * * * *